(12) United States Patent
Gabay et al.

(10) Patent No.: US 7,714,878 B2
(45) Date of Patent: May 11, 2010

(54) APPARATUS AND METHOD FOR MULTIMEDIA CONTENT BASED MANIPULATION

(75) Inventors: Shay Gabay, Kadima (IL); Doron Sitbon, Ness Ziona (IL); Dafna Levi, Tel Mond (IL); Shai Shermister, Ra'anana (IL)

(73) Assignee: Nice Systems, Ltd., Ra'Anana (IL)

( * ) Notice: Subject to any disclaimer, the term of this patent is extended or adjusted under 35 U.S.C. 154(b) by 576 days.

(21) Appl. No.: 10/507,582

(22) PCT Filed: Aug. 9, 2004

(86) PCT No.: PCT/IL2004/000736

§ 371 (c)(1),
(2), (4) Date: Jul. 1, 2005

(87) PCT Pub. No.: WO2006/021943

PCT Pub. Date: Mar. 2, 2006

(65) Prior Publication Data

US 2006/0028488 A1 Feb. 9, 2006

(51) Int. Cl.
G09G 5/22 (2006.01)
(52) U.S. Cl. .......................... 345/626; 700/94
(58) Field of Classification Search ............... 345/626; 700/94
See application file for complete search history.

(56) References Cited

U.S. PATENT DOCUMENTS

| | | | |
|---|---|---|---|
| 4,145,715 A | 3/1979 | Clever | |
| 4,493,027 A * | 1/1985 | Katz et al. | 712/228 |
| 4,525,780 A * | 6/1985 | Bratt et al. | 711/163 |
| 4,527,151 A | 7/1985 | Byrne | |
| 4,821,118 A | 4/1989 | Lafreniere | |
| 4,930,160 A * | 5/1990 | Vogel | 725/30 |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,313,227 A * | 5/1994 | Aoki et al. | 345/626 |
| 5,353,168 A | 10/1994 | Crick | |
| 5,369,739 A * | 11/1994 | Akeley | 345/626 |
| 5,404,170 A | 4/1995 | Keating | |

(Continued)

FOREIGN PATENT DOCUMENTS

DE 10358333 7/2005

(Continued)

OTHER PUBLICATIONS

Industrial Session: Speech-driven cartoon animation with emotions Yan Li, Feng Yu, Ying-Qing Xu, Eric Chang, Heung-Yeung Shum Oct. 2001 Proceedings of the ninth ACM international conference on Multimedia Multimedia '01 Publisher: ACM Press.*

(Continued)

*Primary Examiner*—Javid A Amini
(74) *Attorney, Agent, or Firm*—Ohlandt, Greeley, Ruggiero & Perle, L.L.P.

(57) ABSTRACT

An apparatus and method for multimedia content based manipulation. The method comprises the masking at least one part of the segment of an interaction, said masking can include the hiding, blurring, or alternatively, the enhancing or focusing on a region of interest.

61 Claims, 4 Drawing Sheets

U.S. PATENT DOCUMENTS

| | | | |
|---|---|---|---|
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozler et al. | |
| 5,790,096 A | 8/1998 | Hill, Jr. | |
| 5,796,439 A | 8/1998 | Hewett et al. | |
| 5,828,402 A * | 10/1998 | Collings | 725/28 |
| 5,835,843 A * | 11/1998 | Haddad | 725/115 |
| 5,847,755 A | 12/1998 | Wixson et al. | |
| 5,895,453 A | 4/1999 | Cook | |
| 5,913,161 A * | 6/1999 | Ozulkulu et al. | 455/405 |
| 5,920,338 A | 7/1999 | Katz | |
| 6,014,647 A | 1/2000 | Nizzar et al. | |
| 6,028,626 A | 2/2000 | Aviv | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seely et al. | |
| 6,111,610 A | 8/2000 | Faroudja | |
| 6,134,530 A | 10/2000 | Bunting et al. | |
| 6,138,139 A | 10/2000 | Beck et al. | |
| 6,166,780 A * | 12/2000 | Bray | 348/632 |
| 6,167,395 A | 12/2000 | Beck et al. | |
| 6,170,011 B1 | 1/2001 | Beck et al. | |
| 6,212,178 B1 | 4/2001 | Beck | |
| 6,230,197 B1 | 5/2001 | Beck et al. | |
| 6,256,104 B1 * | 7/2001 | Rumph et al. | 358/1.15 |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,427,137 B2 | 7/2002 | Petrushin | |
| 6,429,948 B1 * | 8/2002 | Rumph et al. | 358/1.15 |
| 6,441,734 B1 | 8/2002 | Gutta et al. | |
| 6,549,613 B1 | 4/2003 | Dikmen | |
| 6,559,769 B2 | 5/2003 | Anthony et al. | |
| 6,570,608 B1 * | 5/2003 | Tserng | 348/143 |
| 6,587,596 B1 * | 7/2003 | Haeberli | 382/283 |
| 6,604,108 B1 | 8/2003 | Nitahara | |
| 6,628,835 B1 | 9/2003 | Brill et al. | |
| 6,675,384 B1 * | 1/2004 | Block et al. | 725/28 |
| 6,704,409 B1 | 3/2004 | Dilip et al. | |
| 6,710,820 B2 * | 3/2004 | Hida | 348/632 |
| 6,724,887 B1 * | 4/2004 | Eilbacher et al. | 379/265.03 |
| 6,937,706 B2 * | 8/2005 | Bscheider et al. | 379/88.22 |
| 7,076,427 B2 | 7/2006 | Scarano et al. | |
| 7,103,806 B1 | 9/2006 | Horvitz | |
| 7,139,031 B1 * | 11/2006 | Bray | 348/468 |
| 7,185,017 B1 * | 2/2007 | Cauvin et al. | 707/101 |
| 7,200,757 B1 * | 4/2007 | Muralidhar et al. | 713/189 |
| 7,200,852 B1 * | 4/2007 | Block | 725/28 |
| 7,346,186 B2 | 3/2008 | Sharoni et al. | |
| 7,382,773 B2 * | 6/2008 | Schoeneberger et al. | 370/353 |
| 2001/0043345 A1 * | 11/2001 | Rumph et al. | 358/1.9 |
| 2001/0043697 A1 | 11/2001 | Cox et al. | |
| 2001/0049787 A1 * | 12/2001 | Morikawa et al. | 713/156 |
| 2001/0052081 A1 | 12/2001 | McKibben et al. | |
| 2002/0005898 A1 | 1/2002 | Kawada et al. | |
| 2002/0009000 A1 * | 1/2002 | Goldberg et al. | 365/200 |
| 2002/0010705 A1 | 1/2002 | Park et al. | |
| 2002/0059283 A1 | 5/2002 | Shapiro et al. | |
| 2002/0087385 A1 | 7/2002 | Vincent | |
| 2002/0194002 A1 * | 12/2002 | Petrushin | 704/270 |
| 2003/0025599 A1 * | 2/2003 | Monroe | 340/531 |
| 2003/0033145 A1 | 2/2003 | Petrushin | |
| 2003/0050834 A1 * | 3/2003 | Caplan | 705/14 |
| 2003/0059016 A1 | 3/2003 | Lieberman et al. | |
| 2003/0128099 A1 | 7/2003 | Cockerham | |
| 2003/0163360 A1 | 8/2003 | Galvin | |
| 2004/0098295 A1 | 5/2004 | Sarlay et al. | |
| 2004/0141508 A1 * | 7/2004 | Schoeneberger et al. | 370/401 |
| 2004/0161133 A1 | 8/2004 | Elazar et al. | |
| 2004/0249650 A1 | 12/2004 | Freedman et al. | |
| 2004/0255032 A1 * | 12/2004 | Danieli | 709/229 |
| 2005/0010475 A1 * | 1/2005 | Perkowski et al. | 705/14 |
| 2005/0108775 A1 * | 5/2005 | Bachar et al. | 725/135 |
| 2005/0164762 A1 * | 7/2005 | Smith et al. | 463/16 |
| 2006/0028488 A1 * | 2/2006 | Gabay et al. | 345/626 |
| 2006/0093135 A1 | 5/2006 | Fiatal et al. | |
| 2006/0264200 A1 * | 11/2006 | Laiho et al. | 455/410 |
| 2006/0287617 A1 * | 12/2006 | Taub et al. | 601/24 |
| 2007/0050620 A1 * | 3/2007 | Pham et al. | 713/165 |

FOREIGN PATENT DOCUMENTS

| | | |
|---|---|---|
| EP | 1 484 892 | 8/2004 |
| GB | 9916430.3 | 7/1999 |
| WO | WO 95 29470 A | 11/1995 |
| WO | WO 98 01838 A | 1/1998 |
| WO | WO 00/73996 A1 | 12/2000 |
| WO | WO 01/47222 A2 * | 6/2001 |
| WO | 02/17165 A2 | 2/2002 |
| WO | WO 02/37856 | 5/2002 |
| WO | WO 02/093838 A1 * | 11/2002 |
| WO | WO 03 013113 A2 | 2/2003 |
| WO | WO 03/049357 A2 * | 6/2003 |
| WO | WO 03 067360 A2 | 8/2003 |
| WO | WO 03 067884 A1 | 8/2003 |
| WO | WO 2004 091250 | 10/2004 |

OTHER PUBLICATIONS

Poster session 1: Analysis of emotion recognition using facial expressions, speech and multimodal information Carlos Busso, Zhigang Deng, Serdar Yildirim, Murtaza Bulut, Chul Min Lee, Abe Kazemzadeh, Sungbok Lee, Ulrich Neumann, Shrikanth Narayanan Oct. 2004 Proceedings of the 6th international conference on Multimodal interfaces ICMI '04.*

Emotion recognition and its application to computer agents with spontaneous interactive capabilities Ryohei Nakatsu, Joy Nicholson, Naoko Tosa Oct. 1999 Proceedings of the seventh ACM international conference on Multimedia (Part 1) Multimedia '99 Publisher: ACM Press.*

A model of visual masking for computer graphics James A. Ferwerda, Peter Shirley, Sumanta N. Pattanaik, Donald P. Greenberg Aug. 1997 Proceedings of the 24th annual conference on Computer graphics and interactive techniques SIGGRAPH '97 Publisher: ACM Press/Addison-Wesley Publishing Co.*

NiceUniverse User's Manual, Jul. 2004 385A0185-05 Rev. A1.*

Article SERTAINTY—Automated Quality Monitoring—SER Solutions, Inc.—21680 Ridgetop Circle Dulles, VA—WWW.ser.com.

Article SERTAINTY—Agent Performance Optimization—2005 SE Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Macs Very Large Population Text—Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana-Deacretaz, Douglas Reynolds—Aug. 8, 2003.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

Towards an Automatic Classification of Emotions in Speech—N. Amir. S. Ron.

NiceVision—Secure your Vision, a prospect by NICE Systems, Ltd.

NICE Systems announces New Aviation Security Initiative, reprinted from Security Technology & Design.

(Hebrew) "The Camera That Never Sleeps" from Yediot Aharonot.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from Information Week, http://www.informationweek.com/story/IWK20030223S0002.

SEDOR—Internet pages form http://www.dallmeier-electronic.com.

(Hebrew) print from Haaretz, "the Computer at the Other End of the Line", Feb. 17, 2002.

\* cited by examiner

APPARATUS AND METHOD FOR MULTIMEDIA CONTENT BASED MANIPULATION

RELATED APPLICATIONS

The present invention relates to U.S. patent application Ser. No. 10/484,107 titled METHOD, APPARATUS AND SYSTEM FOR CAPTURING AND ANALYZING INTERACTION BASED CONTENT filed Jul. 19, 2001, and to PCT patent application serial number PCT/IL02/00197 titled A METHOD FOR CAPTURING, ANALYZING AND RECORDING THE CUSTOMER SERVICE REPRESENTATIVE ACTIVITIES filed 12 Mar. 2002, and to U.S. provisional patent application Ser. No. 60/227,478 titled SYSTEM AND METHOD FOR CAPTURING, ANALYZING AND RECORDING SCREEN EVENTS filed 24 Aug. 2000 and U.S. patent application Ser. No. 10/056,049 titled VIDEO AND AUDIO CONTENT ANALYSIS filed 30 Jan. 2001, the content of which is hereby incorporated by reference.

BACKGROUND OF THE INVENTION

1. Field of the Invention

The present invention relates to content derived systems, in general and to an apparatus and method for manipulating of multimedia based on the content therein, in particular.

2. Discussion of the Related Art

Systems offering capture of interactions comprising voice, video, and other multimedia, including voice over IP, e-mails, and the like, are currently used by organizations. Organizations capture multimedia interactions in order to examine the interactions in real time or off line. Reasons for examining interactions could include the quality assurance of agent's performance, security purposes, compliance purposes, and the like. For example, call centers use capture of interaction and logging devices to accomplish the tracking of transactions, monitor agents' interactions with customers and perform quality assurance on the interactions performed. Presently access restrictions or limitations to interactions are based on restrictions based on the identity of the person accessing the information, the type and identity of the interaction to be accessed or in general the static properties of the interaction. Thus, a supervisor or an agent wishing to listen to or view a captured interaction can do so with proper authorization or access rights. When such an agent or supervisor receives the clearance or has suitable access rights to an interaction he or she may review, access or manipulate the entire interaction. In a first example, if the interaction is a telephone call, the supervisor listening to the interaction can listen to the entire phone call and to all the speakers participating in the call. In a second example the interaction comprises a video interaction with associated voice interaction where the captured voice is substantially synchronized with the video. Currently, the person having access rights to view the video can view the entire video footage which comprises the interaction and may listen to the voice coupled therewith. Persons requesting limited access rights in an organization will be not provided with limited or restricted access to specific aspects or portions of the interaction. A supervisor having access rights to view employee's e-mails will be able to view entire set of e-mail correspondences despite the fact that some of the e-mails, or messages coupled within a single e-mail, could be private or could be associated with another department in the organization. Granted access rights for supervisors to review interactions performed by agents led call centers to dedicate a telephone for personal phone; such telephone is not connected to the capture and logging systems so as to avoid the possibility that a supervisor or another person in the organization will listen in to personal call. Interactions however, comprise many aspects and elements which are presently available to such persons receiving access rights to view the entire interaction. Interactions may comprise a number of speakers, a plurality of persons appearing within a video footage or stream, messages received from a number of persons, names of persons carbon copied or blind carbon copied on messages, data and information which may be related to various departments having different access rights or different organizations or campaigns, and the like.

The presently available systems do not restrict or allow or qualify access to different aspects or different logical content based segments of the interactions and does not assign sensitivity level or access rights to elements or segments of an interaction. A certain segment of the interaction could be vocal, such as voice spoken by one or more speakers. Such segments of interactions could also include visual elements, such as the visual presentation of the appearance of one or more persons (but not all) in a video footage or stream and spoken words by such persons, information or data associated with one issue or department or campaign or persons within the organization. The access permission for segments is not time dependent and is not associated with other activities or with information generated or with policy set in later stages.

Organizations face an ongoing conflict between the requirement to provide employees at all levels with access to interactions so as to perform their assigned tasks and the requirement to minimize risks from access to sensitive, privileged or otherwise inappropriate information. An example that reflects these requirements can be found in the COPC (Customer Operations Performance Center) Performance Management System Standards. The COPC Performance Management System Standards, published during the year 2004, is a set of management practices and training for customer-centric service operation that provides that organizations must have a documented privacy policy that considers any legal requirements and defines how end-user privacy will be protected. The COPC guidelines specifically provide that the organization must have rules how an interaction is monitored and a plan for communicating the findings of all transactions monitored to staff.

In addition, the cycle of information dissemination is increasingly shorted requiring on-the-fly solutions for access control of elements or segments of an interaction. Current systems rely on static definitions for accessing an entire interaction, at times time dependent, lacking the ability to selectively provide access to elements or segments of an interaction. Automatic or manual access approvals on-the-fly or even off-line to interactions is not presently available.

There is therefore a need in the art for an apparatus and method to enable selective and dynamic access to different types, different aspects, and different segments of an interaction.

SUMMARY OF THE PRESENT INVENTION

One aspect of the present invention regards an apparatus for content based manipulation of multimedia, such as audio or video. The apparatus comprises a masking generator device to select a content masking method to be applied to content, and to activate content masking, and a masking methods engine to provide a content masking method to the masking generator device.

A second aspect of the present invention regards a method for content based manipulation of multimedia. The method comprises generating content masking in accordance with content events, metadata defining content structure, and content user data.

The advantages of the present invention include the control of access into segments of an interaction, whether such control includes the masking, hiding, blurring of information within said interaction. Further such control can include the restriction to view a particular item, the restriction from recording a particular interaction or a part thereof, the replacing of a segment of an interaction with predetermined information, the denial of access to a segment of an interaction or the enhancement of a segment of an interaction. The control proposed by the present invention is associated with a portion of the interaction. Each portion of such interaction can be masked or altered or manipulated in association with the actions and rules associated with the said interaction and alternatively with the profile of the user accessing the said interaction.

A third aspect of the present invention includes a method for content based masking of video, audio or screen streams, said stream comprising one or more interaction, the method comprising generating content masking on at least a part of the interaction based on events, or metadata or content user data, associated with the least one interaction. The method further comprises the step of obtaining metadata associated with the interaction from a content input device. A content input device can be a camera or a microphone or other data capturing devices. The method can further comprise the step of masking the metadata obtained from the content input device and associated with the interaction. A screen can be any one of the following: a display device, a computer screen, a video screen, a television screen a portable device screen. The generation of content masking in association with the interaction can be altered based on one or more user request. The method can further comprise the step of analyzing the obtained metadata or the stream associated with the interaction. The method further comprises the step of associating the metadata associated with the interaction with a segment of the interaction for which content masking is generated. The method further comprises the step of selecting one or more content masking to be performed on the one or more interaction to be masked. The method further comprises the step of altering at least a part of the interaction to be masked or of inserting a content masking element into the stream associated with the interaction be masked. The step of generating content masking can comprise generating content masking from the stream obtained and associated with the interaction or generating content masking from the stream obtained and associated with the interaction and subsequently masked interaction. The step of generating content masking can also comprise generating content masking from a first masked content and a second masked content; each said masked content is associated with an interaction. The step of generating content masking can also be dependant on a previous generation of content masking or on a previously performed action by the user or an element of the apparatus of the present invention. The content can be any multimedia content. The user data can be any multimedia content user data. Masking can include any one of the following: hiding of information; replacing of information; blurring of images or information; preventing recording of information; denying access; enhancing a region of interest; improving visibility of an image or information; encrypting of information; manipulation of multimedia content based on actions associated with rules.

According to a fourth aspect of the present invention there is provided an apparatus for content based masking of video, audio or screen streams, the stream comprising one or more interaction, the apparatus comprising a content masking generator for generating content masking on at least a part of the interaction based on events, or metadata or content user data, associated with the interaction. The apparatus further comprises a metadata capture device for obtaining metadata associated with the at least one interaction and one or more capture device to capture video, audio or screen stream. The apparatus can also comprise a metadata analysis device for analyzing the metadata obtained from the metadata capture device and associated with the interaction and a masking methods device to provide content masking methods to the content masking generator to be applied to content associated with the interactions. The generation of content masking associated with the interactions can be altered based on a user request or other input provided to the apparatus. The apparatus further comprises an event identification device to recognize events in content associated with the interaction and based on the results of the analysis of the content, metadata or user data captured or obtained and a request handler to generate displays and to respond to commands associated with multimedia display requests, and a masked streaming device to generate selectively masked content associated with the interaction. The masking content generators alter at least a part of the interaction to be masked and inserts content masking elements into the stream associated with the interaction to be masked during capture or subsequent to the capture, or during the analysis of the stream or subsequent thereto. The events identification device identifies single or compound events. The apparatus can further comprise a masked storage to store masked content and an unmasked storage to store unmasked content. The apparatus further comprises a triggering device to activate or control content capture, content recording, content storage, or content masking activation.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

An apparatus and method for multimedia content based manipulation is disclosed. In the context of the present document when the word "masking" is used it could be construed as one of the meanings listed in the following non-limiting list: a) hiding, b) replacing, c) blurring, d) preventing recording, e) denying access, f) enhancing a region of interest, g) improving visibility and the like manipulation of multimedia content based on actions associated with rules, and h) transmitting commands to multimedia capture devices, such as camera Pan-Zoom-Tilt, spectrum change, frame rate change, mute sound, and the like.

In the context of the present invention, an interaction is defined as any data or information exchanged between at least two individuals or between an individual and an information system, such as performing back-office transaction while interacting via a transactional system. An interaction can comprise one of the following: a telephone or cellular phone call, a video footage or a stream, an e-mail, an SMS, a chat session, a web or other network session and the like. While, referring to multimedia, the preferred embodiment of the present invention refers to audio, video, screen data and metadata related information interaction or a combination thereof. Such reference is made without limiting the general application of the present invention and the scope of the present invention which will be apparent to persons skilled in the art.

The proposed apparatus and method is designed to enable or restrict access to interactions according to predetermined organizational access rights based on the content of the interaction or to enhance the multimedia stream according to and based on dynamic and adaptive manipulation scenarios. The proposed apparatus and method is further designed to mask, according to its meanings, segments of portions of interactions according to predetermined organizational procedures based on the content of the interaction and of the type of users of the interaction. The masking can be done either in a negative or a positive manner. Thus, masking can be used to mask the entire content except a certain portion thereof or could be used to mask only a certain portion of the content. The masking could be applied to the information stream itself or on the system metadata. The access to parts of the interaction is allowed or restricted by using a masking method detailed below based on the content of the interaction, as well as on other metadata information associated with the interaction. Segments, portions and elements of the interaction could be enhanced where the enhancement is based on the content of the interaction, on other metadata information associated with the interaction, on historical or concurrent transactions, as well as system requirements like Level of Service (LOS), total stream size, and the like. The masking is performed based on various predetermined events and provide predetermined actions for masking (allowing or restricting multimedia through masking manipulation), also in the layer configuration of the system of the present invention.

According to the invention content based masking of video, audio or screen streams comprising one or more interactions are captured and content masking is generated on at least a part of the interaction. The content masking is based on events, or metadata or content user data, associated with the interactions. Metadata associated with the interaction is obtained from a content input device such as a camera or a microphone or other data capturing devices. The generation of content masking in association with the interaction can be altered based on one or more user request. Alteration means the changing of the masking applied to the content associated with the interaction, such as revealing a segment or part previously hidden and the like. The obtained metadata or the stream associated with the interaction is further analyzed preferably before masking is performed. The metadata is associated with the segment of the interaction for which content masking is generated.

Figure 1:
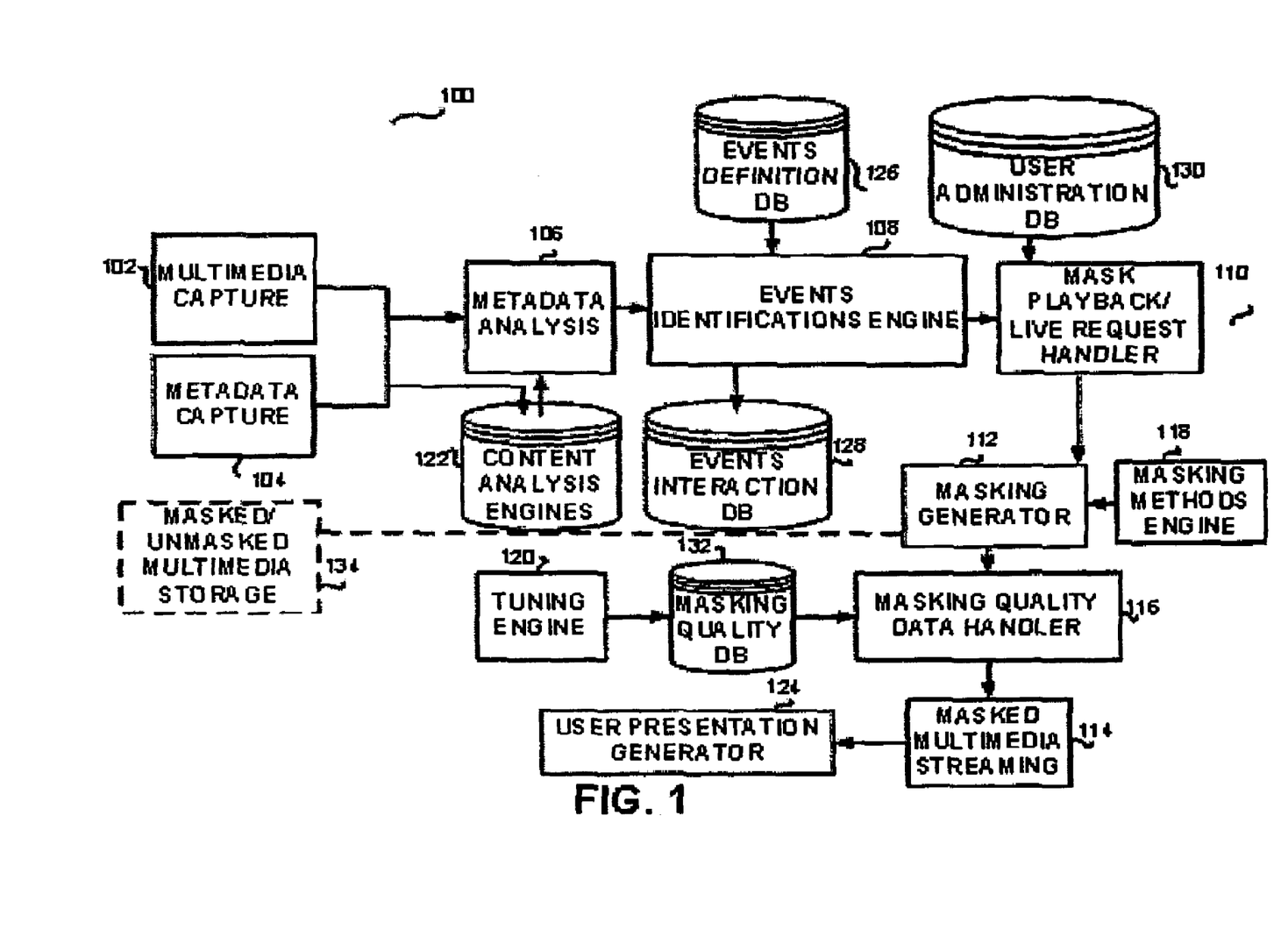
FIG. 1 is a schematic block diagram of the multimedia content based masking apparatus, in accordance with the preferred embodiments of the present invention.

Referring now to FIG. 1 showing a block diagram of the proposed apparatus for multimedia content based masking, generally referenced 100. The apparatus 100 comprises a multimedia capture device 102, a metadata capture device 104, a metadata analysis device 106, an events identification engine 108, a mask playback/live request handler 110, a masking generator 112 and a secured multimedia streamer device 114. The apparatus 100 could also comprise a manual masking generator 116, a masking methods engine 118, a tuning engine 120, a content analysis engine 122 and a user presentation generator 124. Optionally, the apparatus 100 can also comprise one or more data structures to handle the information associated with the operation of the present invention. Such can include an events definition data structure 126, an events interaction data structure 128, a user administration data structure 130, and a masking quality data structure 132. In addition, various storage devices can be associated with the apparatus 100. Such storage devices can further comprise a masked/unmasked multimedia storage 134, or a general interactions storage device (not shown). Storage devices can include a disk or a tape device or a DAT device and any other currently known or later developed storage devices, optical or other which can hold or store data for request based retrieval. The apparatus I 00 is connected or can comprise one or more multimedia capture devices 102. The multimedia capture devices 102 can include capture devices capturing voice, video, screen events, screens, key strokes from a keyboard or another device, data streams, e-mail, faxes, chat sessions, physical access devices and the like. A voice capturing device can be a telephone or a cellular phone, a satellite phone, a wireless device, a microphone, a radio frequency receiving device, a voice over IP module or device, a facsimile machine and the like. A video capture can include the stream captured or the events occurring within the said video as noted from the changes (events) in the video, stream. The capture device can also include a computing device, mobile or fixed, in which sessions of data communications occur. Such can include any data streams or data exchange between individuals or machines, including for example, e-mail, chat sessions, key strokes on a keyboard, use of virtual keyboards or pens, touch screen use, mouse use, peripherals use and any interaction with a computer. Physical access devices can include "smart" access restricting devices or barriers such as doors which can be opened or locked or controlled from a remote location, cameras or microphone or other recording or logging equipment controlled from a distance, water and gas mains, electricity supplying stations, and any other such similar physical device which can be controlled from a distance and can produce data associated with its physical status. Other such physical devices can include devices for controlling of public transportation vehicles, such as subways, trains, elevators, escalators, and any other remotely controlled aircraft, sea, ground or underground vehicles and the physical devices that control such vehicles, like crossings, traffic lights, semaphores, landing lights or landing direction devices, switching devices, and the like. In addition, other remotely controlled devices can include heating and cooling systems as well as air conditioning and sewage treatment devices or facilities. In addition, screen events and screens can be captured as described in detail in U.S. patent application Ser. No. 10/362, 096 titled SYSTEM AND METHOD FOR CAPTURING, ANALYZING AND RECORDING SCREEN EVENTS filed 24 Feb. 2000 and to U.S. patent application Ser. No. to U.S. patent application Ser. No. 10/362,096 titled SYSTEM AND METHOD FOR CAPTURING BROWSER SESSIONS AND USER ACTIONS filed 21 Feb. 2003.

In addition, input data from chemical sensors, optical or mechanical sensors could be captured and processed. Thus data from a chemical sensor could identify a specific chemical substance or a specific molecular structure. Data from optical sensor could provide motion indications and page detections. Mechanical sensors could be associated with scales or various mechanical counters.

Those skilled in the art will appreciate that any interaction between individuals or machine can be captured by one or more capture devices and that the present invention envisage the capturing of such an interaction by one or more capture devices capturing one or more aspects, such as voice, video, data and the like, of the interaction. As noted above, the capture devices can be a directly linked to the apparatus 100 or can be an external capture devices located locally, or remotely, from which the apparatus 100 receives the captured interactions. The terms locally can refer to the same room, floor, or building and the term remotely can refer to another building in the same area or city or even another building or location, in another city or even country. Locations can include buildings and any other location where interactions take place, including call centers, banks, offices, and secured places, public places, such as train stations or airports and the like. While captured interactions are received from the capture devices enumerated above, additional information about the multimedia captured can be received from the metadata associated with the multimedia captured. In association with the multimedia capture devices the apparatus 100 also comprises a metadata capture device 102. The metadata received is associated with the multimedia captured and can include the location of the multimedia capture device 102, or the location of the interaction, the time the interaction was captured and its length. In addition, the metadata can include data relating to the multimedia from other systems. Such data can include information stating from which recording systems or logging systems the capture is received, such as NICE log manufactured by Nice Systems Ltd. of Israel. In addition, metadata can include environmental conditions, whether computerized or real world, additional detail as to the scene viewed, the conversation spoken, the data exchanged, historical statistics, other calls from the same agent, information on suspicious object descriptors from different interactions, and the like. One non-limiting example would be information about the path of an e-mail, a VOIP session, or a chat session. Another non-limiting example can be information about a person or a location shown within a video stream captured. Another non-limiting example could include data indicating the geographical location coordinates of a cellular phone device where the data could be obtained from an associated cellular control center. Yet another non-limiting example could include GPS (Global Positioning System) data indicating geographical location coordinates of a satellite phone device.

Persons skilled in the art will appreciate the various other types of information and data which can be received and processed in association with the interaction captured. In addition, while the metadata capture device 104 can be separate to the multimedia capture device 102 it will be easily realized that the metadata capture device 104 can be a constituent part of the multimedia capture device 102. Thus, for example, a camera capturing a scene can also transmit the PTZ parameters used at any given time, the time and date the video stream is captured, the name of the camera, other environmental parameters, and the like. The metadata capture device 104 may also receive data or information from telephony related services such as Computer Telephony Interface (CTI), Call Detail Recording (CDR), Interactive Voice Response (IVR), Dual Tune Multi Frequency (DTMF), and extension signaling. The metadata analysis device 106 performs an analysis on the metadata received from the metadata capture device 104 and on the interactions captured by the multimedia capture 102. The metadata analysis 106 uses various analysis on the data received through the use of content analysis engines 122. The content analysis engines 122 is linked on the one side to the multimedia capture device 102 and the metadata capture device 104 and linked on the other side to the metadata analysis device 106. The content analysis engines 122 could be allocated statically or dynamically in order to optimize calculation power. The content analysis engines 122 could be available for online or offline streams for offline availability. The dynamic allocation of the engines 122 is based on metadata capture of offline information, such as, for example, information indicating an unlawful intrusion into the premises, and the like. The content analysis engines 122 could include a word spotting content analysis engine to identify the appearance, or the absence or the appearance of words or a sequence of words belonging to pre-defined context related lexicon groups to identify the frequency a word is used or is used in the context of a lexicon; to identify the frequency words appear which belong to a lexicon group; to identify words which represent numbers; to identify words that represent a string, a suffix, a prefix. For example, absence of words can be used to later identify a segment of the application missing which means that a specific interaction cannot be released outside the organization without counsel's permission for failure to state a particular disclaimer. The content analysis engines 122 can also include a speech to text content analysis engine to convert speech into text for processing as text and to identify to identify full or partial transcription, word count and to obtain the textual context of the words through identifying whether the context is positive, negative or belongs to a particular subject. For example, if the context of the conversation within the interaction in a specific section thereof is negative and the rest is positive, the later processing in accordance with the present invention may limit access to the negative context section until approved by a supervisor or a manager. The content analysis engines 122 can also include a video analysis engine to analyze video streams to identify objects, persons, and object contact, such as where persons meet or a box or luggage exchanged or where cars collide.

The video analysis engine can also determine the velocity of objects, such as whether persons are running or walking or jumping and also recognize faces through face recognition algorithms. The content analysis engines 122 could also include a video analysis engine for counting count objects in line or in general, track suspicious path of objects within a single stream or multiple streams, detecting abnormal behavior based on comparison with regular behavior detected in the same scene., and the like The content analysis engines 122 can also include a screen analysis engine to analyze activities performed on the screen of a computer through GDI, and data mining analysis to analyze data searches and other data mining activities, CTI analysis to analyze and identify the various CTI elements, IVR analysis to identify the various IVR elements. In addition, the content analysis engines 122 can comprise an audio analysis engine to determine talk over to detect when two or more persons are speaking at the same time, emotion detection to detect high emotions of one of the speakers, speaker hunting to detect a particular speaker, language detection to identify the spoken languages, gender detection to identify the gender of the speakers and silence detection to detect those parts of the audio interaction which do not include a conversation. An emotion detector can detect the level of the volume of the speaker's voice and classify the emotion, such as whether the person is nervous or upset and the like. In addition, the content analysis engines 122 can also comprise a key stroke analysis, to determine what was typed, how fast and with what intervals. In addition, In addition, the content analysis engines 122 can comprise data analysis engine to analyze data received from physical device so as to conclude the patterns of use of the physical device. The use of the engines will enable at a later stage, such as during real-time monitoring, during content playback and during content retrieval, to restrict access to items analyzed. One example would be to restrict access to a segment of a video stream shown during a playback operation initiated by a user that shows two people meeting, or mask a predefined segment of a video stream showing cars collide having injured people therein, or in the context of the organization restrict access of supervisors to parts of an interaction which are private. Likewise, the apparatus of the present invention may restrict access to a video interaction. One non-limiting example relates to a situation in which certain region covered by a camera is restricted for monitoring, playback, retrieval or both, due to the presence of a specific object located within the field of view (FOV) of the camera. Another non-limiting example regards privacy issues, such as hiding the face of a particular person, such that the face will be masked, obscured, blurred, enhanced, or the like, throughout the review of the interaction by a non-approved personal. While such personal may view the video stream as they may be required to view other elements or parts of the interaction, the face of a particular person, such as a client may be masked to avoid his or her identification. In opposite if the face of the client is the item to which access is granted, the face region of interest can be enhanced while other elements are blurred or are not enhanced. Another example relates to words uttered or written in e-mails relating to private matters of the workers in the organization such as salary or other private information. Once identified and as will be shown here below the apparatus of the present invention may restrict the access of persons to the actual confidential details. Thus, a manager, a supervisor or any other authorized person may be allowed to view a communication involving an employee, but the employee's communication with human resources or the employee's salary information will be deleted, hidden, concealed or masked. One other non-limiting example could be to restrict a sales person from access to parts of a lead received on a potential sale, if another sales person is already assigned the said lead. An additional non-limiting example concerns a marketing manager or a product manager that are enabled to access only those segments of an interaction that are directly related to the product line or business details while the customer may also discuss cross organizational issues. As noted above the masking operation can be associated with both the hiding or blurring of information and on the other hand the enhancement of information or a region of interest. An alternative option would be to mask the entire field of view but for a specific region of interest. Person skilled in the art will appreciate the many options available to the user at manipulating the multimedia content in the various masking methods shown herein above and below.

Still referring to FIG. 1 the events definition data structure 126 comprises a number of data types, such as events, actions and layers. An event is defined as an occurrence to be identified within the interaction or metadata captured. One or more events can comprise a scenario of various activities. For example, a scenario can be an interaction in which credit card or personal details are exchanged. The credit card scenario could involve a set of consecutive events taking place during the transaction. Such events could include credit card detail screen capture events, keyboard keystrokes capture events, and the like. Another example is an interaction in which an agent advises a customer as to possible investments, and the like. A scenario may comprise one or more events characterizing the scenario to be identified and marked for later processing. A plurality of events can characterize a scenario. Events could be identified during the initial phases of processing or could be based on current data while a retrieval request is submitted. One non-limiting example concerns a security policy regulated by account identification or by project identification. When a multimedia content retrieval request is made in order perform content playback the event will be re-calculated in order to determine whether the requesting party is a member of the project team or whether he is authorized to deal with the customer account at the time of the request. The above described logic allows organizations to enforce a dynamic security policy events and scenarios can be defined for any type of multimedia. Non-limiting examples, can include be a certain word spoken, a text written in a written message, an emotion detected, an object identified, a screen events taken, a data item sent or received, a key stroke performed and the like. In addition, a defined event can comprise one or more events, that is one or more occurrences within the interaction or the metadata can be predefined to comprise an event. For example, in the credit card details exchange, one event can be the credit card details screen being loaded by the agent to his terminal, key strokes including a template of a credit card, such as "####-####-####-####" and in addition identifying that the customer has spoken numbers during this segment of the interaction. These three events comprise the credit card details exchange scenario. Alternatively events can be defined as a single event to be applied to the interactions captured and the associated metadata. Compound events may be based on the existence or non-existence of "progeny" or "child" events. One non-limiting example concerns the identification of the execution of trading actions where a required "progeny" or "child" event, such as the verbal confirmation of the order by the customer, may not exists. In addition to events the events definition data structure 126 comprises actions. Actions are defined as the actions to be taken once an event is identified or when the data retrieval request is submitted. In addition, the data structure 126 comprises a plurality of layers. Layers are a series of actions associated with an event. A number of layers may be created for the same event or series of events, thus providing a number of different actions for the same event or group of events. For example, if an event is a word spoken, the action in layer 1 can be "mute the headset for 10 seconds prior to the word". For the same event an action in layer 2 can be "skip 2 seconds from recording before and after the word while streaming the secured multimedia", or action in layer 3 "replace screen streaming with pre-defined image or stream". The data structure 126 also comprises data logical links associating between events or group of events (such as scenarios) with actions to be taken once an event or a group of events is identified and the layers defining which the various actions to be associated with the same event or group of events. The layer can be associated with the profile of a user. For example, a layer titled "medical details" can be defined as the actions replacing characters on a screen. Whenever a non-authorized person access a data structure comprising, among other data, private medical details, the characters associated with private medical details are masked on the screen of the viewer. Like examples are personal detail layers, transaction size layer, and the like, for which different persons in the organization have access thereto. Persons skilled in the art will appreciate the many other events and scenarios which can be employed in the context of the present invention. The events identifications engine 108 processes the metadata received from the metadata analysis device 106 in order to detect the events. The engine 108 further retrieves the events or group of events to be processed from the events definition data structure 126 and searches the metadata for the defined events. The events identifications engine 108 can use a number of alternative processing modes on the metadata to be processed. The event identifications module 108 could perform a single pass over the metadata in order to identify one or more event. If a scenario is searched for the sum of the events of the scenario will be retrieved and searched on the metadata. The events identification engine 108 module 108 can perform multiple passes over the same metadata in order to detect compound events.

Still referring to FIG. 1 compound events are events for which a previous event must be detected to activate the second event. Thus, a first pass is performed to identify events and then a second pass is performed to identify events which one condition therein is the existence of the first event. The multiple passes may be on the same metadata or on metadata associated with different captured interactions. Similarly, compound events and multiple passes can be performed. An example of a compound event is an event comprising the existence of a screen event and the agent sending an e-mail to a particular recipient. In the first pass the events identifications engine 108 identifies the existence of the screen event (an event defined in the events definition data structure 126). In the second pass the engine 108 identifies the send e-mail operation and the recipient name with which the event is associated. It will be realized that during the first pass the e-mail sending act was not detected as such act is not defined as an event by itself. Another non-limiting example for a compound event is an event comprising a credit card data entry and a customer saying the numbers of her credit card over the telephone while speaking with an agent. The first pass on the metadata associated with the database of the organization will identify the credit card data entry and a second pass on the phone interaction with the customer will identify the audio segment in which the credit card is being provided. When processing video streams the events identification engine 108 processes each frame and can also search for predefined vectors. When processing frames, the engine 108 can identify events within the frames. When the event is identified, the engine 108 stores the spatial grid location of the event identified. Such can be a specific location determined according to frame coordinates, and optionally a vector of movement of an object on the screen. The identification of events on the screen in association with the required actions dictates the data to be later stored by events identification engine 108 so as to identify the item or object or event later to be masked. Thus, for example, if an event comprises "locate persons X" and the metadata associated with the video stream, which is the result of the face recognition content analysis engine, includes the identity of person X on a number of frames, the engine 108 will retrieve said frames and use the event associated action on said frames. If for example, the event action states "determine spatial coordinates for event" the engine 108 will identify the spatial coordinates on each frame wherein person X appears and will store such parameters in the events interaction data structure 128 for later use. Alternatively, the action can call for "identify person X head". In such case the engine 108 retrieves the frames associated with person X and determines the spatial coordinates and the vector of "persons x head". Alternatively, the engine 108 can search events or scenarios on the interactions or metadata on a predetermined or random interval of time. One non-limiting example can be a search to be performed every 30 seconds or another like time frame. The engine 108 generates a data record for each metadata for which events are identified. The data record includes the identification of the metadata, the identification of the interaction, the location of the event on the interaction and the actions to be taken when masking is to be performed. Other data fields may include the associated layer of the actions, the scenarios names, specific time within the interaction in which the event occurred, the channel number, the extension number, machine number, the name of the speaker associated with the event, the area on a frame within which the event was identified, the vector of movement of the object identified, the data handle and specific location within said data item identifying the event and the like data associated with the event, the actions to be taken and the interaction. Many other like data fields associated with the various events can be stored by engine 108. The data records associated with the identified events are stored in the events interactions data structure 128. In addition, the engine 108 can optionally mark the interaction in which an event has been identified. To mark the interaction the engine 108 stores a status flag on the interaction stream. The status flag is associated with the data record corresponding to the identification of the event. In another embodiment the mark is performed by adding a number of data fields to the interaction, said data fields comprising the data record associated with the data record to include the event details and the action details.

The mark could be performed by adding a data bit or a number of data bits at the precise location of the event, said data bits are placed at the start and end of the event. The data bit comprises a Boolean value. The Boolean value identifies the start and the end of the event. At the replay of the interaction, the data bit "alerts" the playback device that an event which may be masked exists and that a masking event processing should take place prior to playing back the segment of the interaction marked with the data bits. The data bit can alternatively comprise the handle for the data record associated with the event and stored in the events interaction data structure 128. In another alternative the data bit may include a reference to the layer associated with the events identified so as to allow the playback device to quickly determine if the person playing back the interaction is allowed to access the relevant segment marked on the interaction. Alternatively, the event is noted in association with the interaction, such as on a data structure associating the interaction and its associated metadata with the event identified, and not directly and physically thereon so as to maintain the original interaction unchanged. Such data structure includes a table comprising the event handle associated with an interaction handle and optionally metadata handle. Persons skilled in the art will appreciate the different methods for noting the event on the interaction or on the metadata or associated data structures associated with the event so as to timely identify the event before playback or content retrieval is performed on the particular segment of the interaction.

Still referring to FIG. 1, the request/push handler 110 is responsible for handling requests from various users or external applications for access to interactions either in real-time during on-line monitoring or during off-line playback and retrieval. The request/push handler 110 will also handle requests from external applications and/or application integrations utilizing API, Web services, or any other machine-to-machine communication methods either in a synchronous or an asynchronous mode. Similarly, handler 110 is responsible for handling prescheduled push requests to push interactions to recipients. For example, a supervisor may issue a request through the handler 110 to playback the recording of an interaction in order to review the interaction which took place between an agent and a customer. Such request is received and processed by the request/push handler 110 which retrieves the said request interaction, the events interaction identified and information from the user administrative data structure 130. The request/push handler 110 can generate metadata that could be used for masking. To provide a non-limiting example, a video or and audio segment that is requested more than X times during a Y time interval could trigger a masking rule. The rule will affect the marking of the segment for a manual review by an officer in order to identify in the content sensitive data or unethical use of the information. Other requests can concern off-line queries about interactions or segments thereof, real-time monitoring of an interaction, scenario reconstruction of an interaction, and the like. User administrative data structure 130 holds information about the users of the system, including their associated profiles and security settings or layers. The retrieval request can be for any type of interaction, including a phone call, a video stream, a screen session, any data or metadata. The masking generator 112 in association with the masking methods engine 118 is responsible for the generation of masking method information. The generator 112 receives from the request/push handler 110 the data concerning the request and data regarding the associated user and in accordance with the received information determines the type, the segment, or the portion of the multimedia that should be masked. The determination is performed following the operation of the masking method engine 118 effecting the provision of a suitable multimedia content masking method. The multimedia content masking method could comprise video masking, voice masking, data masking, screen masking, enhancement of multimedia or a region of interest, selective masking or enhancement of the multimedia content, including of a predetermined region of interest, and the like. The video masking method could include video block masking sub-methods and video concealment sub-methods. The video block masking sub-method could include the following block masking options: a) denial to replay a request, b) implementation of a black screen during play, c) replacement of the video stream with an alternative stream, such as a stream containing an informative message, d) a calculation of a motion vector, e) hiding a block of actions, f) improving the quality of video for masked objects, g) adding PZT tracking to masked objects, h) processing of multimedia properties related to masked stream elements, such as gain level, storage options, and the like. The video concealing sub-method could include the following concealment options: a) concealing video recorded in the same hour the previous day, b) concealing video that had been previously authorized for viewing, c) concealing a pre-defined video, d) deletion of the original multimedia stream based on masking, and the like. The voice masking method includes a silence implementation sub-method, a security message or pre-defined audio implementation sub-method, applying voice transformation method that will allow understanding of the voice but will prevent personal identification by voice, and the like. The data masking method includes a search masking sub-method, a present masking sub-method, and the like. The search masking sub-method could include mask search of the record, mask search on a data field, and the like. The present masking sub-method could include masking the presentation or discovery of the record, masking the presentation of a data field, and the like. Data masking can be applied on the raw data level or on the aggregative and descriptive statistical level. Data masking can also be applied on data transferred to external information systems or databases such as business intelligence, DWH (Data Warehousing), integration tools, operational or analytical applications such as ERP (Enterprise Resource Planning), CRM (Customer Relationship Management), PLM (personal Liaison Management) knowledge management, web portals and any other similar organizational applications. The screen masking method includes screen block masking sub-method, a screen concealing sub-method, and the like. The screen block masking sub-method includes a) denial of the play request, b) implementation of black screen intervals, c) implementation of replacement screens, d) hiding a block or a specific field, e) hiding a block specific screen application, and the like. The screen concealing sub-method includes the insertion of a stationary field or empty field, the replacement of text with stars, and the like.

Note should be taken than the above described methods, sub-methods and option could be made effective in various combinations in complex masking methods. The masking generator 112 relays information concerning the type and/or the segment to be masked and the information concerning the masking method to the masking quality data handler 116. The making quality data handler 116 in association with the making quality data structure 132 determines the level of the masking quality. The masking quality data structure 132 stores masking quality parameters. Data structure 132 could be tuned optionally by the tuning engine 120 either automatically or following manual activation. The data handler 116 collects the information concerning all the aspects of the masking and uses the information to process the multimedia in order to mask specific aspects, segments, portions, fields, blocks, and the like of the multimedia. The masked multimedia is streamed by the masked multimedia streaming 114 and the masked multimedia is presented to the user as output 124. Optionally, the masked multimedia could be stored in the masked multimedia storage 134 for a pre-defined period or for a pre-defined volume. An example of the masking effect is the blurring of an object or an individual appearing in the masked multimedia. Masking could be implemented in the following scenario. A service engineer receives access to an interaction such as a telephone call containing instructions regarding a required service. The same interaction also includes financial terms and sums to be paid for the service. The interaction segment associated with the finances will be blocked for the service engineer's review where various masking method could be used to accomplish the objective. Thus, the entire segment containing financial negotiation could be replaced by a replacement screen, such as a black screen, a static screen, a warning message, or the like, as was described herein above in association with the masking methods supplied by the masking methods engine. A masking method could be enhanced via the utilization of a masking formula (not shown) where the masking formula could be based on historical event scenarios. The generation of the masking formula could be either automatic or semi-automatic. As a non-limiting example a video masking process that may effect the generation or the modification of a masking formula will be described. In order to provide alarm notifications during monitoring of a video stream a specific region-of-interest (ROI) is defined on the video images constituting the video stream. The ROI is defined on the video stream by the utilization of Field of View (FOV) limitation. A pre-defined event taking place inside the defined region-of-interest effect the activation of an alarm. If historically the group of total alarms activated includes a proportionally high number of false alarms then one of the solutions is to reduce the size of the ROI. The reduction could be made semi-automatically by recommending to the user an action for the reduction of the ROI zone. Alternatively, the ROI reduction could be accomplished automatically via the generation of the mask formula. Consequently, the mask formula will include an improved masking algorithm that will reduce sensitivity in the area wherein the high number of false alarms was generated. In yet another non-limiting example the mask formula could be used improving a masking algorithm where historically a high number of alarms are generated where the alarms indicate the false identification of a specifically defined word. The problem could be solved either semi-automatically or automatically. In the semi-automatic mode the user could be advised to activate an improved algorithm when the word is sensed. In the automatic mode a masking formula including the masking algorithm and associated with the masking process could be generated or modified in order to provide an improved algorithm when the problematic word is sensed. The masking formula could be also used implementing general masking options. For example, the masking formula could include data indicating interaction types, interaction segments, and interaction segments that should be always masked or alternatively could include data indicating interaction types, interaction segments, and interaction segments that are not to be masked. Multimedia elements to be masked in accordance with the masking formula could include entire management interactions, (phone calls with managers as participants), specific areas in human body (based on body proportions), pre-defined types of security personnel (police, bodyguards, FBI employees, CIA employees, and the like).

Note should be taken that although the drawing under discussion shows a single multimedia capture device, a single metadata capture device, and a set of single devices, it would be readily perceived that in a realistic environment a multitude of capture could be sending a plurality of multimedia streams and metadata information to a plurality of metadata analyzers, events identification engines, and request handlers. Further note should be taken that the apparatus presented is exemplary only. In other preferred embodiments of the present invention, the entire set of devices, modules, engines, data structures, and handlers could be co-located on the same computing platform. In yet further embodiments of the present invention, a multiplexing device could be added in order to multiplex several multimedia streams and several metadata records from several capturing devices into a multiplexed and combined multimedia and metadata record stream. A de-multiplexer unit could be placed between the capture devices and the metadata analysis device in order to separate the combined multimedia/metadata stream prior to the suitable processing.

Figure 2:
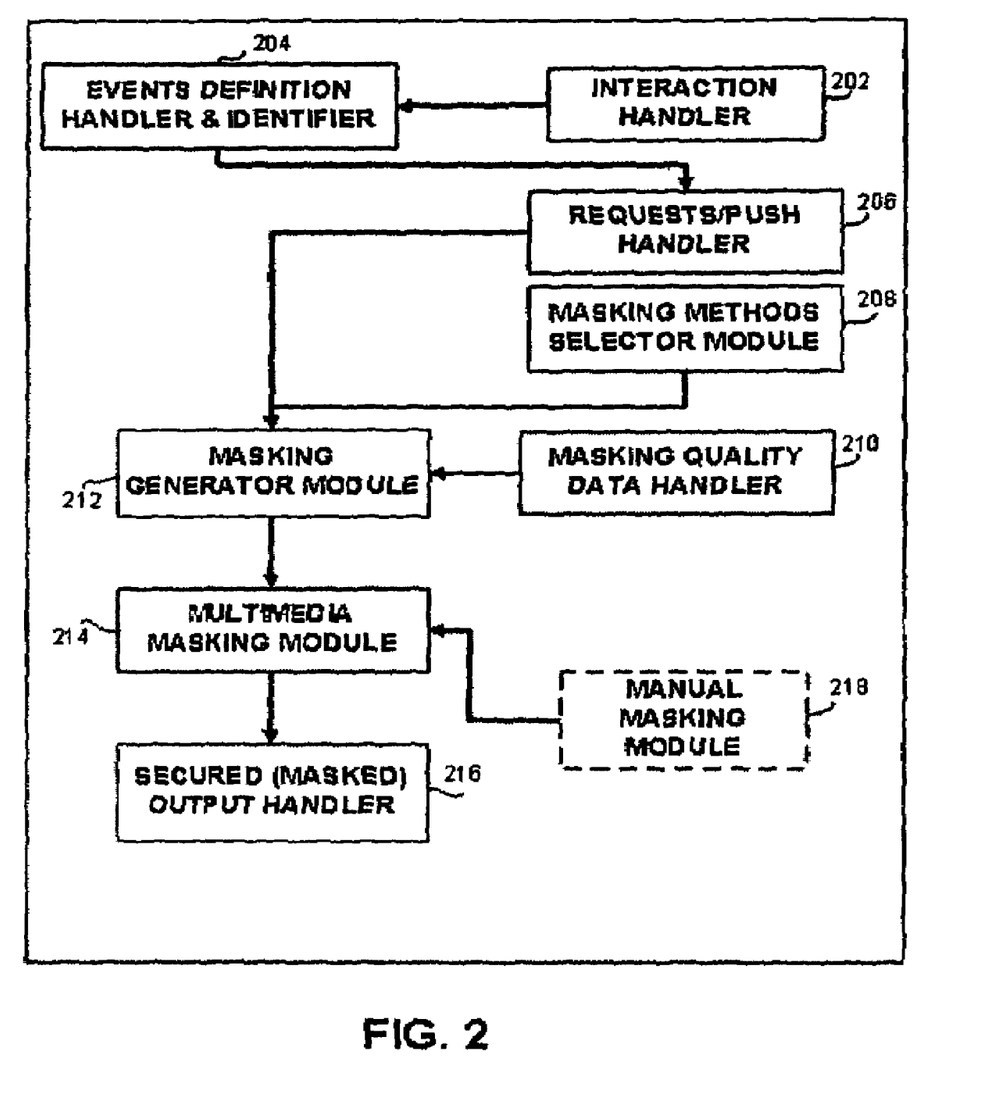
FIG. 2 is a schematic block diagram of the components of the multimedia content based masking application, in accordance with the preferred embodiments of the present invention.

Referring now to FIG. 2 an apparatus 200 is shown in accordance with a preferred embodiment of the present invention. The apparatus 200 includes an interaction handler 202, an events definition handler and identifier 204, a request/push handler 206, a masking methods selector module 208, a masking quality data handler 210, a masking generator module 212, a multimedia masking module 214, a manual masking module 218, and a secured (masked output) handler 216. The interaction handler 202 manages the multimedia interactions performed by the interaction participants, such two or more individuals. The interaction could be performed directly face-to-face or could be performed via diverse communication channels, such as a telephone line, computerized e-mail, fax exchanges, Web-based chat sessions and the like. The management of the interaction involves the capturing of the interaction data via diverse multimedia capturing devices corresponding to the interaction type and the interaction channels. The interaction management further includes the capturing of the interaction metadata or the extraction of the metadata from the multimedia. The metadata includes control information embedded in the interaction data. Thus, metadata could include indications concerning DTMF signaling, e-mail addresses, interaction capturing device types and device identifications, the capture of certain keystrokes on an input keyboard, the activation of function keys associated with a computing device, the pointing and clicking of a pointer device, the activation of keystrokes on a cellular phone signifying the initiation of an SMS message, and the like. In accordance with the interaction channels and the interaction media the metadata could be captured separately or could be extracted from the interaction content. The captured metadata could include locations, time and date, participants' identification, priority parameters, CDR/CTI information IVR information, DTMF, extension signaling, camera parameters, environmental parameters, and date related from external systems. Typically, the interaction content is captured in a multimedia format, such as video, audio, graphics, text, and the various combinations thereof. The metadata associated with the multimedia content is analyzed in order to identify the control information carried thereby. The metadata analysis could include diverse analysis techniques, such as word spotting, speech-to-text, emotion detection, video analysis, screen analysis, audio analysis, data mining, and keystroke analysis. The multimedia content is then streamed to the event definition handler and identifier 204. The handler and identifier 204 processes the multimedia stream in order to identify, to recognize and to classify the various events embedded in the multimedia for later handling. The requests/push handler 206 is responsible for both the automatic initiation of multimedia replay or retrieval requests and for the generation of multimedia content replay requests in response to manual replay commands submitted by the users of the apparatus. The automatic or user command-generated requests activate the masking generator module 212. The generator 212 collects multimedia content masking related information, and activates the masking method selector module 208. The masking method selector module 208 determines the suitable multimedia content based masking method that is to be applied to the multimedia stream to be replayed in accordance with the automatically generated or manual command generated replay requests. The masking generator 212, in association with the masking quality data handler 210, relays the masking information to the multimedia masking module 214. The secured (masked) output handler 216 applies the masking method to the appropriate types, aspects, segments, screens, blocks, motion vectors, or fields of the multimedia stream in order to conceal specifically pre-defined information from the user. Optionally, the masking could be performed manually by the user via the activation of the manual masking module 218. The manual masking module 218 will display a set of parameter requests in order to obtain a suitable set of relevant masking parameters from the user. Consequently, the manual masking module 218 will relay the obtained masking parameters to the multimedia masking module 214. In a manner similar to the automatic masking process the multimedia masking module 214 will relay the masking parameters to the secured (masked) output handler 216 that will generate a suitably masked multimedia output stream to be presented to the user.

Still referring to FIG. 2 in an exemplary interaction scenario a face-to-face interaction is performed between a customer and an agent. It could have been pre-defined that as a result of privacy considerations a certain compliance officer where monitoring the interaction is not allowed to see the video of the customer. As a result the video stream generated by the video capture device covering the customer should be blacked out or replaced with a replacement image during a replay requested by the same compliance officer. The events definition handler and identifier 204 could indicate in the captured video stream the beginning and the end of each video segment that shows the customer. The masking generator module 212 will recognize the requesting user as the specific compliance officer. Thus, a specific masking method will be selected that will effect the blocking out of all the customer-specific video segments. During playback the display of the multimedia stream will include the non-masked image sequences of the video segments in which the agent appears, the non-masked audio stream of both the agent and the customer, and a blacked out video segment with an optional notification to the viewer replacing the image sequences of the customer.

Figure 3:
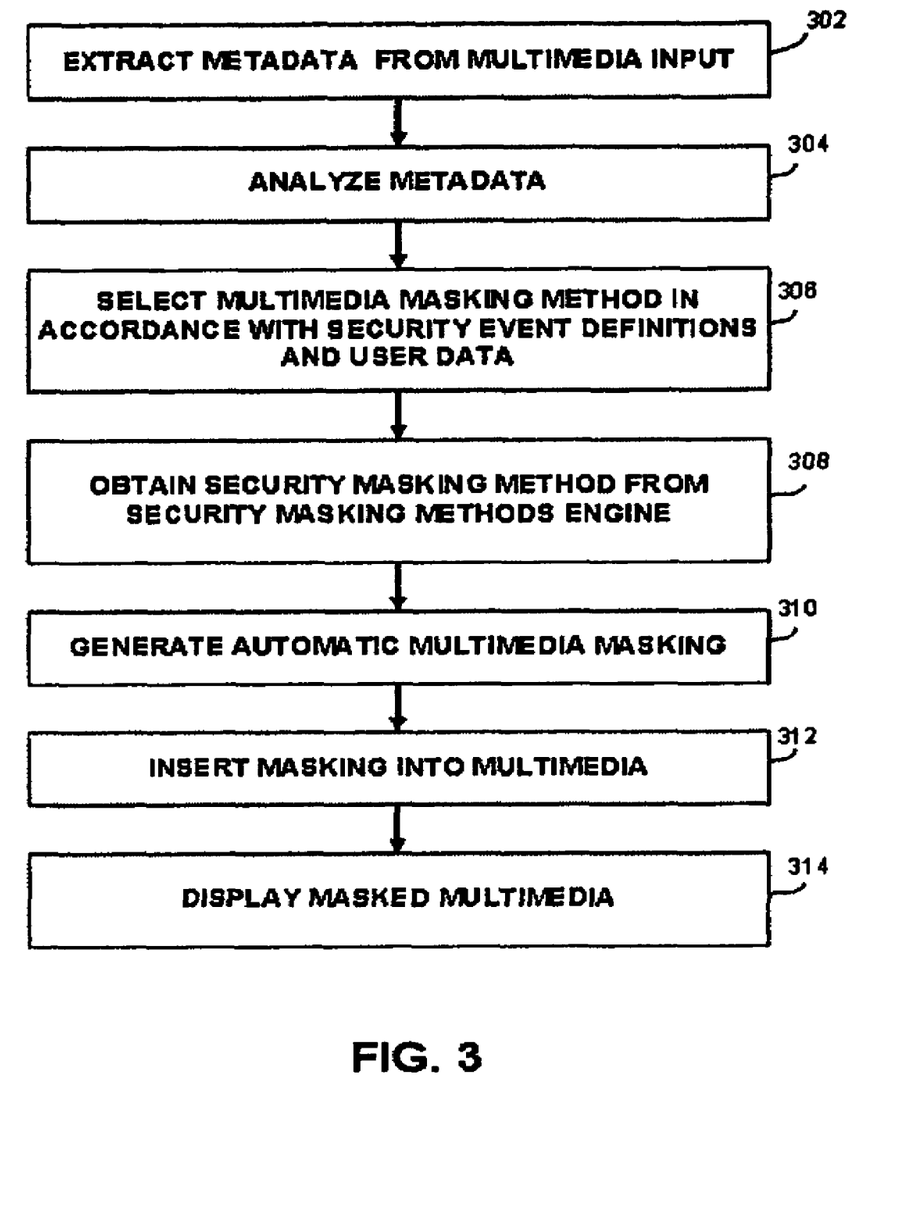
FIG. 3 is a flow chart describing the steps of a method for multimedia content based masking, in accordance with a preferred embodiment of the present invention.

Referring now to FIG. 3 in the preferred embodiment of the present invention at step 302 metadata is extracted from the multimedia input representing the interaction. At step 304 the metadata is analyzed in order to determine specific aspects of the multimedia stream generated by the interaction, such as the type of the interaction, the origin of the interaction and other metadata as detailed above.

At step 306 the masking method is determined in accordance with events definitions and optionally also with associated user data. At step 308 a masking method is received from the masking methods engine. The masking method can be any form of masking of the data, whether through showing details or hiding details as is described in detail in association with FIG. 1. The masking method to be used can be predetermined. At step 310 multimedia masking is generated and at step 312 selected parts of the multimedia are masked in accordance with the masking method by the processing of the suitable part of the multimedia or by the insertion of the masking elements into the multimedia. The step of masking can be performed on the fly and when a request for the review of interaction is requested or in advance on raw data to be saved as masked data to be later retrieved by the requesting user. At step 314 the selectively masked multimedia is displayed to the user.

Figure 4:
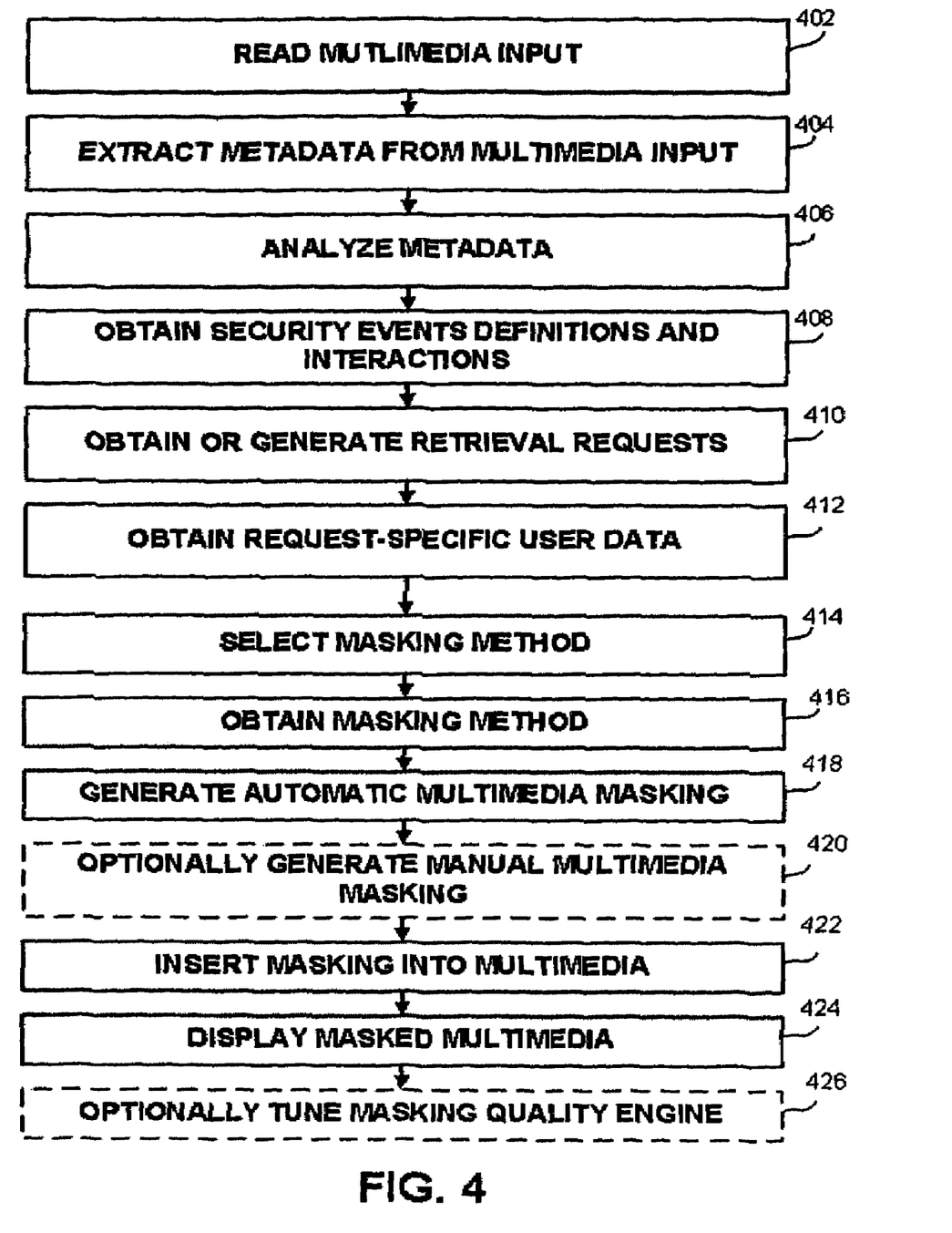
FIG. 4 is a flow chart describing the steps of a method for multimedia content based masking, in accordance with another preferred embodiment of the present invention.

Referring now to FIG. 4 in another preferred embodiment of the present invention at step 402 multimedia input is captured by capturing devices. At step 404 metadata indicating specific aspects of the captured multimedia stream are extracted from the multimedia stream. At step 406 the extracted metadata is analyzed and at step 408 event definitions and interactions are obtained from the events definitions and interactions data structure. At step 410 retrieval requests are generated automatically or in response to user submitted commands. At step 412 information regarding the user is obtained from a data structure storing user data. At step 414 a masking method is selected in accordance with the user data, the events definitions, and the analyzed metadata. At step 416 the parameters of the masking method are obtained from the masking method engine and at step 418 automatic multimedia masking is generated. Optionally, the multimedia masking could be generated in response to the manual insertion of masking parameters by the user (step 420). At step 422 the masking elements are inserted into the multimedia stream and at step 424 the selectively masked multimedia is displayed to the user. Optionally, at step 426 masking quality could be tuned either automatically or in response to the manual insertion of suitable masking quality parameters by the user.

Notes should be taken that in other preferred embodiments of the invention the sequence of the above described steps could differ. As a non-limiting example, the steps 410 through 412 that deal with the retrieval requests could be performed prior to the steps 406 through 408 that deal with events identification. The requests steps could utilize an optional "analyze-on-demand" parameter that could be set either automatically or could be obtained in real-time from a user submitting the request. A specific pre-determined value of the "analyze-on-demand" parameter could indicate an "analyze" command that will effect the performance of the event identification steps (406 through 408) and the subsequent masking steps (414 through 426) after the retrieval steps (410 through 412). An another pre-determined value of the "analyze-on-demand" parameter could indicate a "do not analyze command" and will effect the display of the requested multimedia only while the analysis, event identification and masking steps will be bypassed.

Further note should be taken that both the enhancement and the masking options could be implemented in real-time and nearly real-time via the utilization of Digital Signal Processing (DSP) devices and methods. The proposed apparatus and method further provides the option of overriding the originally recorded multimedia stream on the recording platform and on the storage level. For example, a video recording for the monitoring in a privacy-sensitive environment, such as a public restroom, the field of view (FOV) of the captured image could be limited.

The proposed apparatus could optionally include "smart" triggering devices on each level of the architecture and in association with each component. The triggering devices could be activate and control recording and storage processes and options, DSP (Digital Signal Processing) processes and options, online and off-line (batch) processes, user input, and the like. For example, the type of the display device used for monitoring, playback or retrieval could trigger content masking, such as blocking and concealing or content enhancing. Thus, when a mobile device is used as the display device the type of the device effect either more rigorous masking or high resolution enhancing in order to provide for better tracking or enhanced access control for a specific object, such as individuals and other objects in motion.

The apparatus and method proposed by the present invention could be utilized in a variety of environments. For example, in call centers, agents could be provided with the option to mark certain calls as private and thereby could prevent monitoring of the call. In healthcare industries the proposed apparatus and method could be used for concealing medical personal information from un-authorized personnel, or for tracing all access requests to specific medical information. In call centers and banking institutions the proposed apparatus and method could be utilized for protecting personal information and for concealing system credentials. In government public safety applications selected parts of recordings submitted to courts could be masked for legal reasons, such as court restrictions on revealing the identify or witnesses.

It will be appreciated by persons skilled in the art that the present invention is not limited to what has been particularly shown and described hereinabove. Rather the scope of the present invention is defined only by the claims which follow.

We claim:

1. A method for restricting access to call center multimedia information comprising an at least one audio and screen stream, the method comprising:

recording a first part of the at least one audio stream and a first part of the at least one screen stream comprising a screen event in a data format structure by a multimedia capture device, to obtain at least one recorded audio stream and at least one recorded screen stream, the at least one audio stream and at least one screen stream representing at least one interaction between a customer and an agent of the call center;

automatically marking locations in the at least one recorded audio stream and at least one recorded screen stream, the locations associated with an event, metadata, or content user data;

automatically masking at least two second parts of the at least one recorded audio stream and the at least one recorded screen stream, substantially at the locations, the at least two second parts containing a personal detail or a credit card detail or a medical detail of the customer; and presenting to a user the at least one recorded audio stream or the at least one recorded screen stream as masked, wherein said multimedia capture device is selected from the group consisting of: a disk device, a tape device, a DAT device, a telephone, a cellular phone, a satellite phone, a wireless device, a microphone, a RF receiving device, a VOIP device, a facsimile machine, a computing device in which a session of data communications occurs, and any combination thereof.

2. The method of claim 1 further comprising obtaining metadata associated with the at least one interaction from a content input device.

3. The method of claim 2 further comprising masking the metadata obtained from the content input device and associated with the at least one interaction.

4. The method of claim 1 wherein the screen comprises any one of the following: a display device, a computer screen, a video screen, a television screen, or a portable device screen.

5. The method of claim 4 wherein restricting access refers to restricting access to an event recorded from a screen.

6. The method for claim 1 wherein the masking is altered based on at least one user request.

7. The method of claim 1 further comprising analyzing the obtained metadata or the stream associated with the at least one interaction.

8. The method for claim 1 further comprising associating the metadata associated with the at least one interaction with the at least second part of the at least one recorded audio stream and screen stream.

9. The method of claim 1 further comprising selecting an at least one content masking to be performed on the at least one interaction to be masked.

10. The method of claim 1 further comprising altering at least a part of the at least second part of the at least one recorded, audio and screen stream.

11. The method of claim 1 further comprising inserting an at least one content masking element into the at least second part of the at least one recorded audio and screen stream.

12. The method of claim 1 wherein the masking comprises generating content masking from the at least one recorded audio and screen stream and associated with the at least one interaction.

13. The method of claim 1 wherein the masking comprises generating content masking from a first masked content and a second masked content, each said masked content is associated with an at least one interaction.

14. The method of claim 1 wherein the step of masking is associated with at least one previous masking or on a previously performed action by the user or an element of the apparatus of the present invention.

15. The method of claim 1 wherein the content is multimedia content.

16. The method of claim 1 wherein the content user data is multimedia content user data.

17. The method of claim 1 wherein masking is one of the following: hiding of information; replacing of information; blurring of images or information; preventing recording of information; denying access; enhancing a region of interest; improving visibility of an image or information; encrypting of information; manipulation of multimedia content based on actions associated with rules.

18. The method of claim 1 wherein restricting access to the audio stream and screen stream comprises masking the at least one audio and screen stream except a first portion thereof, or masking only a second portion of the audio and screen streams.

19. The method of claim 1 wherein the metadata is Computer Telephony Interface data and wherein the Computer Telephony Interface data is captured by an external capture device.

20. The method of claim 19 wherein the interaction is between a customer and a machine or a computer application.

21. The method of claim 1 wherein the content user data is a product of analysis.

22. The method of claim 21 wherein the analysis is selected from the group consisting of: audio analysis; emotion analysis; gender detection; language detection; and key stroke analysis.

23. The method of claim 1 wherein the machine is a computer.

24. The method of claim 1 wherein the personal detail or the credit card detail or the medical detail is identified according to a template.

25. The method of claim 24 wherein the template represents a credit card number.

26. The method of claim 1 wherein marking locations in the at least one recorded audio stream and at least one recorded screen stream is done by embedding information in the at least one recorded audio stream or the at least one recorded screen stream.

27. The method of claim 1 further comprising a step of storing the at least one recorded audio stream and the at least one recorded screen stream in masked/unmasked multimedia storage, after masking.

28. The method of claim 1, wherein said session of data communications is selected from the group consisting of email, a chat session, a keystroke, a use of a virtual keyboard or pen, touch screen use, mouse use, peripheral use, an interaction with a computer, and any combination thereof.

29. An apparatus for restricting access to call center multimedia information comprising an at least one audio stream and at least one screen stream, the stream comprising at least one interaction between a client and either an agent of the call center or a machine, the apparatus comprising:

a physical access device;

a multimedia capture device for capturing the at least one audio stream and at least one screen stream;

a content masking generator that automatically marks locations in the at least one audio stream and at least one recorded screen stream, the location associated with an event, metadata or content data, and that masks automatically at least a part of the at least one audio stream and at least a part of the at least one screen stream substantially at the locations and based on user access rights to obtain a masked audio stream an a masked screen stream, the at least a part of the at least one audio stream or at least a part of the at least one screen stream containing a personal detail or a credit card detail or a medical detail of the client; and a user presentation generator for presenting to a user the masked audio stream an a masked screen stream.

30. The apparatus of claim 29 further comprising a metadata capture device for obtaining metadata associated with the at least one interaction.

31. The apparatus of claim 30 further comprising a metadata analysis device that analyzes the metadata obtained from the metadata capture device and associated with the at least one interaction.

32. The apparatus of claim 29 further comprising at least one capture device that captures audio and screen stream.

33. The apparatus of claim 29 wherein the screen comprises any one of the following: a display device, a computer screen, a video screen, a television screen, or a portable device screen.

34. The apparatus of claim 33 wherein restricting access refers to restricting access to an event recorded from a screen.

35. The apparatus of claim 29 further comprising a masking methods device to provide an at least one content masking method to the content masking generator to be applied to content associated with the at least one interaction.

36. The apparatus of claim 29 wherein the masking of the at least one interaction is altered based on at least one user request.

37. The apparatus of claim 29 further comprising an event identification device that recognizes events in content associated with the at least one interaction and based on the results of analysis of the content, metadata or user data captured or obtained.

38. The apparatus of claim 37 wherein the event identification device identifies a compound event.

39. The apparatus of claim 37 wherein the event identification device identifies a single event.

40. The apparatus of claim 29 further comprising a request handler that generates displays and responds to commands associated with multimedia display requests, and a masked streaming device that generates selectively masked content associated with the at least one interaction.

41. The apparatus of claim 29 wherein the masking content generator alters at least a part of the interaction to be masked.

42. The apparatus of claim 29 wherein the masking content generator inserts an at least one content masking element into the at least one audio and screen stream associated with the at least one interaction to be masked.

43. The apparatus of claim 29 wherein the content to be masked is multimedia content.

44. The apparatus of claim 29 wherein the content user data is multimedia content user data.

45. The apparatus of claim 29 wherein masking is one of the following: hiding of information; replacing of information; blurring of images or information; preventing recording of information; denying access; enhancing a region of interest; improving visibility of an image or information; encrypting of information; or manipulation of multimedia content based on actions associated with rules.

46. The apparatus of claim 29 further comprising a masked storage that stores selectively masked content.

47. The apparatus of claim 29 further comprising an unmasked storage that stores unmasked content.

48. The apparatus of claim 29 further comprising at least one triggering device that activates or control content capture, content recording, content storage, or content masking activation.

49. The apparatus of claim 29 wherein restricting access to the at least one audio stream and screen stream comprises masking the audio and screen streams except a first portion thereof, or masking only a second portion of the audio and screen streams.

50. The apparatus of claim 29 wherein the metadata is Computer Telephony Interface data, and wherein the Computer Telephone Interface data is captured by an external capture device.

51. The apparatus of claim 29 wherein the content user data is a product of analysis.

52. The apparatus of claim 51 wherein the analysis is selected from the group consisting of: audio analysis; emotion analysis; gender detection; language detection; or key stroke analysis.

53. The apparatus of claim 29 wherein the machine is a computer.

54. The apparatus of claim 29 wherein the personal detail or the credit card detail or the medical detail is identified according to a template.

55. The apparatus of claim 54 wherein the template represents a credit card number.

56. The apparatus of claim 29 wherein the content masking generator marks locations in the at least one audio stream and at least one recorded screen stream by embedding information in the at least one audio stream and the at least one recorded screen stream.

57. A method for restricting access to call center multimedia information comprising an at least one audio stream and at least one screen stream comprising at least one interaction between a customer and either an agent of the call center or a machine, the method comprising:
capturing, with a multimedia capture device, the at least one audio stream and at least one screen stream;
extracting metadata from the call center multimedia information;
analyzing the metadata;
selecting a multimedia masking method according to the call center multimedia information or the metadata;
obtaining a security masking method from a security masking methods engine;
generating automatically, and based on user access rights, a multimedia masking for the call center multimedia information, using the security masking method;
automatically marking a location in the at least one audio and screen stream by embedding information in the at least one audio stream and at least one screen stream, the location associated with an event, metadata, or content user data;
automatically inserting the multimedia masking into the at least audio stream and screen stream at the location, to create masked multimedia restricting access to a personal detail or a credit card detail or a medical detail of the customer; and
displaying the masked multimedia,
wherein said multimedia capture device is selected from the group consisting of: a disk device, a tape device, a DAT device, a telephone, a cellular phone, a satellite phone, a wireless device, a microphone, a RF receiving device, a VOIP device, a facsimile machine, a computing device in which a session of data communications occurs, and any combination thereof.

58. The method of claim 57, wherein said session of data communications is selected from the group consisting of email, a chat session, a keystroke, a use of a virtual keyboard or pen, touch screen use, mouse use, peripheral use, an interaction with a computer, and any combination thereof.

59. A method for restricting access to recorded multimedia information comprising an at least one audio stream and at least one screen stream comprising a screen event in a data format structure, the streams comprising at least one interaction between a customer and a call center agent, the method comprising:
capturing, with a multimedia capture device, the at least one audio stream and at least one screen stream;
automatically marking a location in the at least one audio stream and at least one screen stream, the location associated with an event, metadata, or content user data;
automatically masking at the location at least a first part of the at least one audio stream and at least a second part of the at least one screen stream, the first part or the second part comprising a personal detail or a credit card detail or a medical detail of the customer, wherein the multimedia capture device records data streams comprising voice, screen events, key strokes, and physical access device data, wherein said multimedia capture device is selected from the group consisting of: a disk device, a tape device, a DAT device, a telephone, a cellular phone, a satellite phone, a wireless device, a microphone, a RF receiving device, a VOIP device, a facsimile machine, a computing device in which a session of data communications occurs, and any combination thereof.

60. The method of claim 59, wherein said session of data communications is selected from the group consisting of email, a chat session, a keystroke, a use of a virtual keyboard or pen, touch screen use, mouse use, peripheral use, an interaction with a computer, and any combination thereof.

61. An apparatus for restricting access to recorded call center multimedia information comprising an at least one audio and screen stream, the stream comprising an at least one audio and screen stream comprising a screen event in a data format structure, the stream comprising at least one interaction between a customer and a call center agent or between a customer and a machine, the apparatus comprising:

a multimedia capture device that captures the at least one audio, and at least one screen stream; and a content masking generator that automatically marks a location in the at least one audio stream or at least one screen stream, and masks at least a part of the at least one audio stream or at least a part of the at least one screen stream thus restricting access to a personal detail or a credit card detail or a medical detail of the customer based on events, metadata or content user data associated with the at least one interaction, and based on user access rights, wherein the multimedia capture device records data streams comprising voice, screen events, key strokes, and physical access device data.

\* \* \* \* \*